United States Patent [19]

Kim

[11] Patent Number: 5,410,100
[45] Date of Patent: Apr. 25, 1995

[54] METHOD FOR RECORDING A DATA FILE HAVING MUSICAL PROGRAM AND VIDEO SIGNALS AND REPRODUCING SYSTEM THEREOF

[75] Inventor: Myoung H. Kim, Seoul, Rep. of Korea

[73] Assignee: Gold Star Co., Ltd., Seoul, Rep. of Korea

[21] Appl. No.: 850,979

[22] Filed: Mar. 12, 1992

[30] Foreign Application Priority Data

Mar. 14, 1991 [KR] Rep. of Korea ............... 91-4077

[51] Int. Cl.6 ........................................... G10H 7/00
[52] U.S. Cl. ........................................... 84/645; 84/601
[58] Field of Search .............................. 84/600–602, 84/639, 645

[56] References Cited

U.S. PATENT DOCUMENTS

| | | | |
|---|---|---|---|
| 4,519,008 | 5/1985 | Takenouchi et al. | 360/952 |
| 4,992,886 | 2/1991 | Klapper | 358/342 |
| 4,992,886 | 2/1991 | Klappert | 358/342 |
| 4,996,679 | 2/1991 | Yoshio | 369/33 |
| 5,038,660 | 8/1991 | Watanabe | 84/601 |
| 5,046,004 | 9/1991 | Tsumura et al. | 84/601 X |
| 5,054,360 | 10/1991 | Lisle et al. | 84/645 |
| 5,056,402 | 10/1991 | Hikawa et al. | 84/645 |
| 5,062,097 | 10/1991 | Kumaoka | 84/645 X |
| 5,079,984 | 1/1992 | Kosugi et al. | 84/645 |
| 5,127,303 | 7/1992 | Tsumura et al. | 84/609 |
| 5,131,311 | 7/1992 | Murakami et al. | 84/609 |
| 5,159,140 | 10/1992 | Kimpara et al. | 84/600 |
| 5,194,682 | 3/1993 | Okamura et al. | 84/625 |
| 5,194,683 | 3/1993 | Tsumura et al. | 84/645 |
| 5,208,421 | 5/1993 | Lisle et al. | 84/645 |
| 5,225,618 | 7/1993 | Wadhams | 84/602 |
| 5,247,126 | 9/1993 | Okamura et al. | 84/609 |
| 5,262,765 | 11/1993 | Tsumura et al. | 345/122 |
| 5,265,248 | 11/1993 | Moulios et al. | 364/DIG. 1 |
| 5,286,907 | 2/1994 | Okamura et al. | 84/601 |

FOREIGN PATENT DOCUMENTS 0372678 6/1989 European Pat. Off. .

*Primary Examiner*—William M. Shoop, Jr.
*Assistant Examiner*—Jeffrey W. Donels
*Attorney, Agent, or Firm*—Poms, Smith, Lande & Rose

[57] ABSTRACT

The data file recording method and reproducing system record musical performance tune signal in the form of MIDI information and background video signal on CD in order to store a number of playing tune signal. The recording method records on CD video information corresponding to and representing the meaning of the words of sheet music by measures. And the recording method records the musical performance information by measures following the video information, wherein the musical performance information includes a measure of MIDI information for playing a measure of a tune in the sheet music and exclusive information for synchronizing the musical performance information with the video information each for measure. The reproducing system comprises pick-up for driving a CD to read-out the data file from the CD, dividing circuit for dividing the data file from the pick-up into musical performance information and video information, playing tune generator for generating playing tune signals according to the musical performance information from the dividing circuit, and video reproducer for reproducing video signals corresponding to and representing the meaning of the words of sheet music by processing the video information from the dividing circuit.

8 Claims, 4 Drawing Sheets

METHOD FOR RECORDING A DATA FILE HAVING MUSICAL PROGRAM AND VIDEO SIGNALS AND REPRODUCING SYSTEM THEREOF

FIELD OF THE INVENTION

This invention relates to a, so-called, karaoke system including a compact disk player (hereinafter, "CD player") and sound module and, particularly to a recording method of data file for musical program wherein musical instrument digital interface (hereinafter, "MIDI") information in addition to background video signal are recorded on a CD to store a number of playing tune signals and to the reproducing system thereof.

BACKGROUND OF THE INVENTION

In general, a karaoke system means a reproducing system which integrally corporates a CD player and sound module to reproduce video signals and audio signals recorded on the CD. Such a karaoke system comprises signal pick up means for driving CD in a constant angular velocity or in a constant linear velocity to read-out from the CD the video signals and audio signals, error correcting means for correcting errors of the read-out signal from the signal pick up means and separating the error-corrected signal into video signal and audio signal, sound means for processing the separated audio signal from the error correcting means to output the processed audio signal, and video processing means for processing the separated video signal separated by the error correcting means to output the processed video signal to an external display unit. The video signals and audio signals are recorded on the CD driven by the system in the form of digital signals. The video signals recorded on the CD have real-time video information which is compressed and processed to minimize the information amount, but the audio signals include both real-time tune information and sound information which is being played really.

Therefore, conventional CD cannot store a large quantity of playing tune signals and video signals due to the aforesaid reason. Also, there has been considerable trouble in that, if a user intends to reproduce a large quantity of playing tune signals and video signals using a conventional karaoke system, he has to frequently exchange the CD. Also, there has been a remarkable economical burden in that a user has to purchase many CD, when he wishes to maintain a large quantity of playing tune signals and video signals.

For example, if the conventional karaoke system drives a CD of the diameter 30 cm in a constant linear velocity for 60 minutes in order to reproduce playing tune signals and video signals from the CD, and 5 minutes are spent in reproducing a piece of playing tune signals and video signals, then a CD of diameter 30 cm can store on both of its sides only 24 pieces of playing tune signals and video signals.

SUMMARY OF THE INVENTION

Therefore, it is a principal object of this invention to provide a data file recording method for recording a large quantity of playing tune signals and video signals onto a CD.

Another object of this invention is to provide a data file reproducing system for reproducing a CD in which great deal of data file are stored, each of data file comprising video information and musical performance information, both of which are distinguished by measures and arranged in order.

To achieve the principal object as discribed above, the recording method of data file in accordance with the present invention comprises steps of; recording consequently on CD video information for words of sheet music by measures; recording on CD video information having a plurality of frame video information, said frame video information including a plurality of image signals corresponding to and representing the meaning of words in sheet music by measures; and recording musical performance information by measures following the video information recorded on CD, said musical performance information including a measure of MIDI information for playing a measure of a tune in the sheet music and exclusive information for synchronizing the measure MIDI information with the frame video information measure by measure.

To attain the other object as described above, the data file reproducing system of the present invention comprises means for driving a CD to read out the data file recorded on the CD, means for dividing the read out data file from the driving means into musical performance information and video information, said video information including a plurality of frame video signals corresponding to and representing the meaning of words in a sheet of music by measure, means for generating playing tune signals according to the musical performance information from the dividing means, means for reproducing video signals by processing the video information from the dividing means to generate frame video signals, said frame video signal having a plurality of images corresponding to and representing the meaning of words of sheet music, and video matching means for controlling the operation of the video processing means according to exclusive information contained in the musical performance information to synchronize the playing tune signal for a measure of sheet music with the frame video signal corresponding to and representing the meaning of the words of sheet music for each measure.

BRIEF DESCRIPTION OF THE DRAWINGS

These and other objects and features of this invention will become more clearly understood through the following detailed descraption in conjunction with the accompanying drawings, in which.

DETAILED DESCRIPTION OF THE INVENTION

Figure 1:
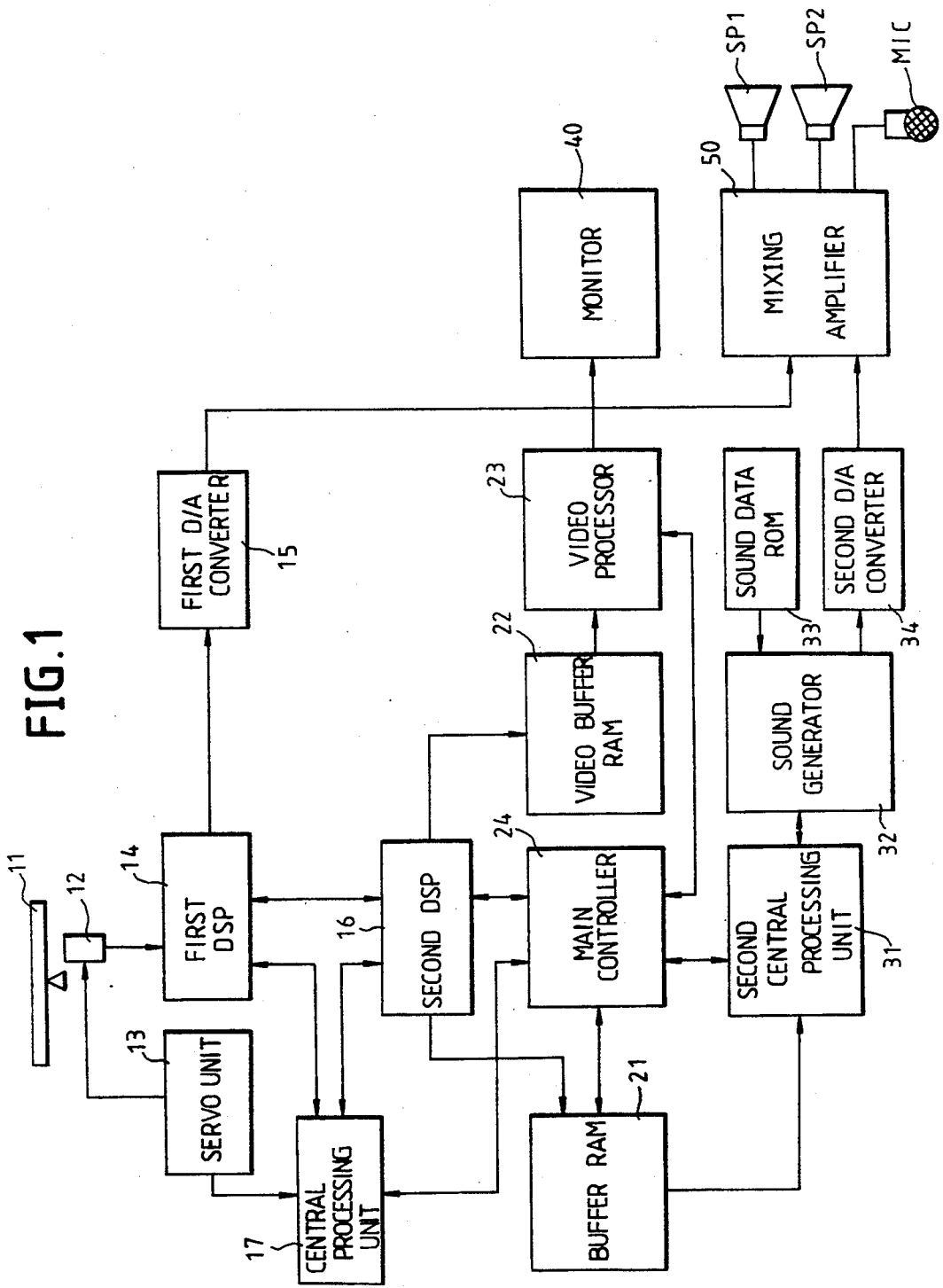
FIG. 1 is a schematic block diagram of the karaoke system according to an embodiment of the present invention.

Referring now to drawings, FIG. 1 is a block diagram of the karaoke system according to the embodiment of the present invention. The karaoke system comprises a CD 11 in which both video information and MIDI information for each frame are recorded, and a pick-up unit 12 for driving the CD to read-out the information recorded on the CD. Also, the system includes servo unit 13 for controlling the pick-up unit 12 under control of first central processing unit, a first DSP (Digital Signal Processor) 14 for inputting the read-out information from the pick-up unit 12 to correct errors generated in the read-out information by Cross Interactive Read Solomon Code for the reliability of the CD's real-time processing data and for dividing the error-corrected information into data file for musical performance and audio information, the first digital/analog converter (hereinafter, "D/A converter") 15 for converting the audio information from the first DSP 14 into analog audio signal, and the second DSP 16 for correcting errors generated in the data file from the first DSP 14 and for dividing the error-corrected data file into MIDI information and video information for reliability of CD, according to the laser error correction code technique.

Further, the system includes first central processing unit 17 for controlling the first DSP 14 and second DSP 16 to correct error appropriately and simultaneously controlling the information output course of the first and second DSPs 14 and 16, buffer RAM 21 for inputting the MIDI information from the second DSP 16 to store the input MIDI information, video buffer RAM 22 for inputting the video information from the second DSP 16 to store the input video information, a video processor 13 for receiving the video information from the video buffer RAM 22 to process the received video information in real-time, and main controller for controlling all of the system.

Furthermore, the system includes the second central processing unit 31 for performing the overall control function to generate sound corresponding to the MIDI information received from the buffer RAM 21, sound generator 32 for reading out sound data from sound data ROM 33 by control of the second central processing unit 31 to generate digital tune signal, second D/A converter 34 for converting the digital tune signal from the sound generator 32 into analog tune signal, monitor 40 for displaying the background video signal output from the video processor 23, and a mixing amplifier for mixing and amplifying the analog audio signal from the first D/A converter 15, the analog tune signal from the second D/A converter 34 and an output tone signal from microphone MIC to output the mixed and amplified signal.

Hereinafter, the operation of the karaoke system illustrated in FIG. 1 will be explained.

In CD on which genereal real time audio information is recorded, the audio information recorded on CD is played back by audio reproducing means comprising pick up unit 12, first DSP 14 and D/A converter 15.

However, in the case of CD wherein both MIDI (Musical Instrument Digital Interface) information for sheet music and video information for one frame by each measure of the sheet music are recorded, as exemplified in FIG. 2, the pick up unit 12 reads out MIDI information and video information from the CD 11 and provides the read out information to first DSP 14. The first DSP 14 corrects errors generated in the read out information from the pick-up unit 12 and thereafter provides the error-corrected information to the second DSP 16 by control of the central processing unit 17.

Further, the second DSP 16 corrects errors in MIDI information and video information from the first DSP by control of the central processing unit 17 and then writes the error-corrected MIDI information into the buffer RAM 21 and stores error-corrected video information into the video buffer RAM 22. At the time when the second DSP 16 completes the storage of MIDI information and video information, main controller 24 controls buffer RAM 21, whereby it provides MIDI information written in buffer RAM 21 in a series to central processing unit 31 and also controls the video processor 23 according to exclusive information contained in the MIDI information from the buffer RAM 21. By the control of the main controller, the video processor 23 processes video information written in the video buffer RAM 22 to generate video signal in form of analog signal and provides the generated video signal to monitor 40.

Meanwhile, second central processing unit 31 controls sound generator 32 according to MIDI information output from the buffer RAM 21. The sound generator 32 under the control of the second central processing unit 31 reads sound data corresponding to MIDI information from the sound data ROM 33 and generates digital tune data by assembing the read sound data. The generated digital tune data from the sound generating unit 32 is provided to speakers SP1 and SP2 via the second D/A converter 34 and mixing amplifier 50. The speakers SP1 and SP2 output the tune corresponding to the digital tune data. At this time, an user can sing a song with the playing tune using a microphone MIC.

Figure 2A:
FIGS. 2A~2C illustrate examples of sheet music for explaining the recorded format of MIDI information, respectively.
Figure 2B:
Figure 2C:
Figure 3:
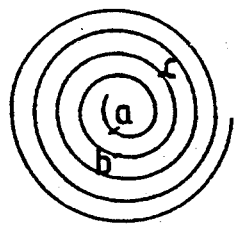
FIG. 3 illustrates the format of data file for musical performance recorded on CD.

FIG. 3 illustrates a format of the video information and MIDI information contained in the data file which is recorded on CD. In FIG. 3, a plurality of frame video information corresponding to and representing the meaning of the words classified by each measure of a piece of sheet music as shown in FIG. 2A~2C is written on a-b section. The frame video information includes a plurality of image signals. On b-c section, a musical performance information for sheet music as shown in FIGS. 2A~2C is written.

Figure 4:
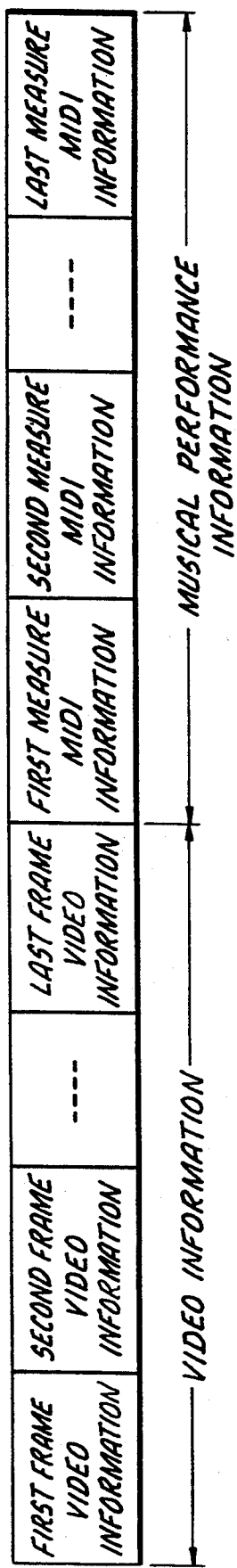
FIG. 4 illustrates the format of data file for playing a tune.

FIG. 4 illustrates the formats of the video information between the a-b section and the musical performance information between the b-c section, in relation to the sheet music in FIG. 2. In FIG. 4, video information in an order of video information of first frame, of second frame . . . of the last frame is recorded on section a-b of CD such as shown in FIG. 3, and musical performance information in an order of first measure's MIDI information, second measure's MIDI information, . . . the last measure's MIDI information are recorded on section b-c of CD such as shown in FIG. 3. Also, exclusive information is added to the portion at which MIDI information of each measure ends ( ↑ mark) as shown in FIG. 4, to match frame video information with measure MIDI information. The second central processing unit 17 informs main controller 24 at the end portion of each measure's MIDI information, e.g., exclusive information is input, a measure of playing tune is completed. At that time, main controller 24 provides to video processor 23 by the end information representing the termination of measure's playing tune a specific command to the effect that it should prepare frame video information for the following measure. Then, video processor 23 reads and processes the video information for the following measure from video buffer RAM 22 based on the specific command in order to generate video signal and provides the generated video signal to monitor 40 and displays it on the monitor.

Figure 5:
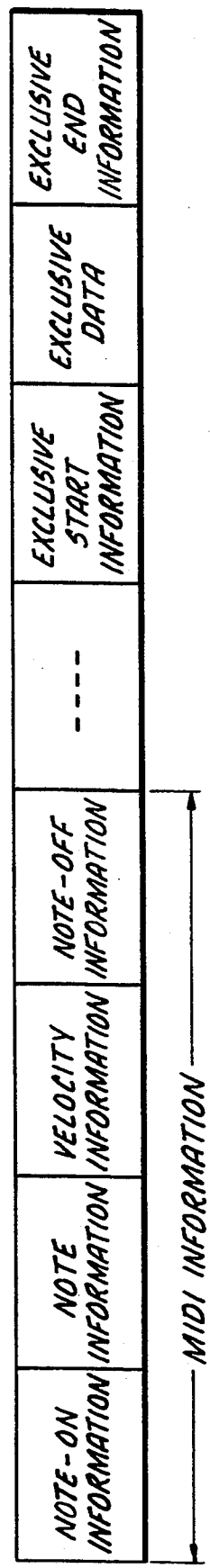
FIG. 5 illustrates the format of MIDI information for one measure.
Figure 6:
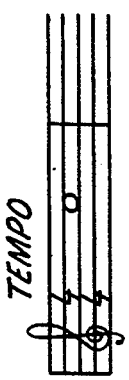
FIG. 6 illustrates an example of sheet music for explaining the MIDI information.

FIG. 5 illustrates format of MIDI information for the sheet music for one measure. In FIG. 5, MIDI information, comprising note-on information, note information, velocity information and note-off information, represents the musical note such as shown in FIG. 6. Here, the note-on information designates the output start time of playing tone and the number of channels to output the playing tone. The note information represents the pitch of the playing tone, and the velocity information represents the intensity of playing tone. Lastly, the note-off information designates the output end time of playing tone and the number of channels to output the playing tone. The measure MIDI information includes a great amount of MIDI information and an exclusive information arranged after the MIDI information for the last playing tone of measure. In the measure MIDI information, the exclusive information comprising exclusive start information, exclusive data and exclusive end information is a command to the effect that the frame video information synchronizes with the measure MIDI information. The exclusive start information represents the start of exclusive data. The exclusive data have the frame number of frame video information corresponding to and representing the meaning of the following measure's words or the frame number of the frame video information corresponding to and representing the meaning of the current measure's words in order to designate preparation of frame video information corresponding to and representing the meaning of words of the following measure. The exclusive end information represents the end of exclusive data.

FIGS. 7A~7D illustrate formats of note-on information, note information, velocity information and note-off information.

The initial four bits among note-on information illustrated in FIG. 1 are status bits and "1001" is start time of the playing tone; the remaining four bits are for designating the number of channels to output the playing tone, such four bits being allow to designate the maximum 16 channels. Here, the channels can output differently sound of note each other. In general playing music, 8 channels, 4 channels and 4 channels are assigned to melody part, accompaniment part and rhythm part, respectively, and tone color can be varied according to the kind of channel.

Figure 7A:
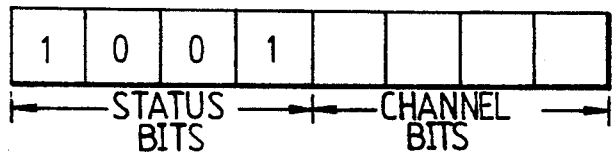
FIGS. 7A~7D are drawings for explaining the format of MIDI information in FIG. 5, respectively.
Figure 7B:
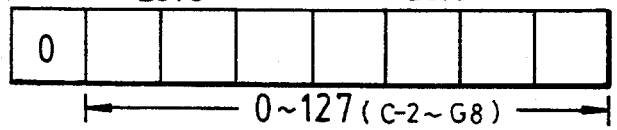

Note information shown in FIG. 7B is information bits designating the pitch of playing tone, wherein the first bit has 0 value and the remaining 7 bits represent the pitch between 0–127 steps. The width of pitch with 128 steps is from G2 to G0, and in case of pianos, they include all of A-2~G2 pitch.

Figure 7C:
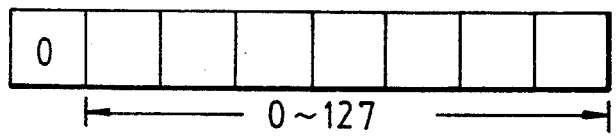

Velocity information shown in FIG. 7C are information bits designating the intensity of a playing tone, wherein the first bit has 0 value and the remaining 7 bits represent the intensity from 0 step to 127 step; 0 represents no tone and 127 represents the most intense sound in music (FFF).

Figure 7D:
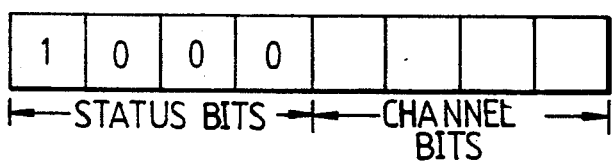

In note-off information shown in FIG. 7D, initial 4 bits having a value of 1000 represent end time of playing tone and the remaining 4 bits designate the number of channels to terminte output of playung tone. At this time, the number of channels capable of being designated is 16.

Accordingly, in case of playing music using MIDI information format, MIDI information comprising as shown in FIGS. 7A~7D is output consequently, and in case of playing the music sheet as noted in FIG. 6 in this manner, it is sufficient to have only 4 bits' memory.

FIG. 8A~8D illustrate format of the exclusive information arranged at the ends of each measure's MIDI information, the exclusive format which directs video processor to read frame video information for the following measure.

Figure 8A:
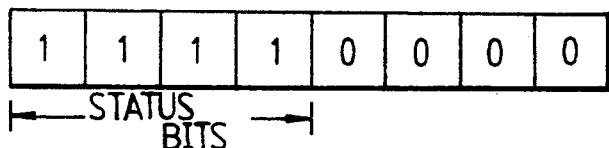
FIGS. 8A~8D are drawings for explaining the format of exclusive information in FIG. 5, respectively.
Figure 8B:
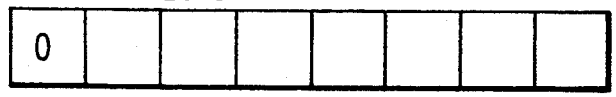

First, FIG. 8A is a format of exclusive start information representing the start of exclusive data. FIG. 8B. is an information bit representing the identity number of each manufacturing company, the identity number which the MIDI Standards Association grants the manufacturing company where those companies use exclusive information for their unique function.

Figure 8C:
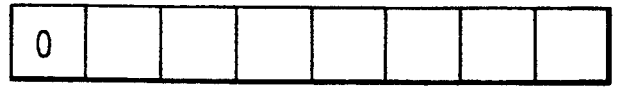
Figure 8D:
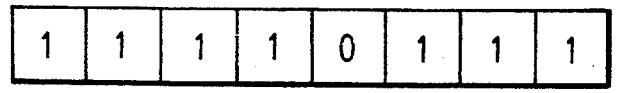

FIG. 8C illustrates format of exclusive data. In FIG. 8C, initial bit is 0 and the remaining 7 bits have a predetermined value representing frame's number for the following frame video information Lastly, FIG. 8D illustrates an exclusive end information representing end of exclusive data, wherein exclusive end information comprises 1 byte.

Here, the features of the present invention in conjuction with real time playing with MIDI playing data file playing are: first, where sheet music as shown in FIG. 6 is real time played in moderato four time C, the length of playing tone is approximately 1.6 seconds. And if the playing tone for sheet music as shown FIG. 6 is recorded as sampling frequency 44.1 KHz and 16 bits, 44.1K*16*1.5*2=2116.8 Kbytes of storing capacity is spent in CD. However, where a format of musical performance information is made using MIDI format, as explained aforesaid in relation to FIG. 7 and 8, a sheet music as shown in FIG. 6 can be recorded on the CD with only a little amount of memory of about 32 bits.

As aforesaid, the present invention has advantages in which the amount of information for one piece of music can be reduced to the degree of approximately 30 Kbytes by means of general playing music being MIDI playing formatted; and in a CD of the diameter 12 CM capable of storing 540 Mbytes, wherein the vidoe and musical performance information for 1000 pieces of music can be stored, which results in improved capacity. An advantage in this invention is that users can enjoy playing music with free option of melody, rhythym and accompaniment by controlling the playing channels. Also, the present invention has the further advantage of application to the musical education field by freely controlling playing tempo and measure color.

What is claimed is:

1. A method for recording a data file having musical program and video signals, said method comprising the steps of:
   recording on CD video information having a plurality of frame video information, said frame video information including a plurality of image signals corresponding to and representing the meaning of the words in sheet music by measures; and
   recording musical performance information by measures associated with the video information recorded on CD, said musical performance information including a measure of MIDI information for playing a measure of a tune in the sheet music and exclusive information for synchronizing the measure MIDI information with the frame video information measure by measure.

2. The method of claim 1 wherein said step of recording musical performance information including a measure of MIDI information further includes:
   recording note-on information for designating output start time of musical performance tone and the number of channels to output the musical performance tone;
   recording note information for representing pitch of the musical performance tone;
   recording velocity information for representing intensity of the musical performance tone; and
   recording note-off information for designating output end time of the musical performance tone and the number of channels to terminate output of the musical performance tone.

3. The method of claim 1 wherein said step of recording musical performance information including exclusive information further includes:
   recording exclusive data for having the frame number of the video information corresponding to and representing the meaning of words of sheet music;
   recording exclusive start information for representing the start of the exclusive data; and
   recording exclusive end information for representing the end of exclusive data.

4. A data file reproducing system for reproducing the video and musical performance information recorded on a CD, the system comprising:
   means for driving the CD to read out the data file recorded on the CD;
   means for dividing the read out data file from the driving means into the musical performance information and video information, said video information including a plurality of frame video signals corresponding to and representing the meaning of words in sheet music by measure;
   playing tune signal generating means for processing the musical performance information from the dividing means to generate playing tune signals;
   video reproduction processing means for processing the video information from the dividing means to generate frame video signals, said frame video signals having a plurality of images corresponding to and representing the meaning of words of sheet music; and
   video matching means for controlling the operation of the video processing means according to exclusive information contained in the musical performance information to synchronize the playing tune signal for tune of sheet music with the frame video signal corresponding to and representing the meaning of words of sheet music for each measure, such that as said playing tune signal is reproduced measure by measure said frame video signal is selectively changed after each measure.

5. The data file reproducing system of claim 4 wherein said playing tune signal generating means comprises:
   first memory means for storing temporarily the musical performance information divided by the dividing means;
   second memory means for storing sound data and
   MIDI processing means for decoding the musical performance information stored in the first memory means, reading and combining the sound data stored in the second memory means to generate playing tune signals.

6. The data file reproducing system of claim 5 wherein the video reproduction processing means includes:
   third memory means for storing temporarily the video information divided by the dividing means; and
   video processing means for processing the video information stored in the third memory means to generate video signal.

7. The data file reproducing system of claim 6 wherein the second memory means has capacity capable of storing at least the video information corresponding to words of a sheet music and the first memory means has capacity capable of storing at least the musical performance information corresponding to tune of a sheet music.

8. The data file reproducing system of claim 7 further comprising:
   second dividing means being coupled to the CD driving means for dividing audio signal from the output signal of the CD driving means; and
   mixing means for mixing the audio signal from the second dividing means and the playing tune signal from the playing tune signal generating means.

* * * * *